United States Patent
Thakur et al.

(10) Patent No.: US 10,642,031 B2
(45) Date of Patent: May 5, 2020

(54) EXPANDING A PUPIL USING REPLICATION VIA BEAM SPLITTER FEEDING A WAVEGUIDE

(71) Applicant: TEXAS INSTRUMENTS INCORPORATED, Dallas, TX (US)

(72) Inventors: Vivek Kumar Thakur, Plano, TX (US); John M. Ferri, Allen, TX (US); Paul L. Rancuret, McKinney, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 0 days.

(21) Appl. No.: 16/403,027

(22) Filed: May 3, 2019

(65) Prior Publication Data
US 2019/0339515 A1  Nov. 7, 2019

Related U.S. Application Data

(60) Provisional application No. 62/666,476, filed on May 3, 2018, provisional application No. 62/786,881, filed on Dec. 31, 2018.

(51) Int. Cl.
*G02B 27/00* (2006.01)
*G02B 27/28* (2006.01)
*G02B 27/14* (2006.01)
*F21V 8/00* (2006.01)
*G02B 27/12* (2006.01)

(52) U.S. Cl.
CPC ....... *G02B 27/0081* (2013.01); *G02B 6/0023* (2013.01); *G02B 6/0026* (2013.01); *G02B 6/0076* (2013.01); *G02B 6/0078* (2013.01); *G02B 27/126* (2013.01); *G02B 27/141* (2013.01); *G02B 27/283* (2013.01); *G02B 27/286* (2013.01)

(58) Field of Classification Search
CPC .............. G02B 27/0081; G02B 27/126; G02B 27/141; G02B 27/286; G02B 27/283; G02B 6/0078; G02B 6/0026; G02B 6/0023; G02B 6/0076; G02B 6/0011
See application file for complete search history.

(56) References Cited

U.S. PATENT DOCUMENTS

| | | | |
|---|---|---|---|
| 10,254,542 B2* | 4/2019 | Kollin | G02B 27/0103 |
| 10,281,655 B2* | 5/2019 | Roberts | G02B 6/02052 |
| 2016/0124154 A1* | 5/2016 | Roberts | G02B 6/02052 |
| | | | 359/630 |
| 2018/0120563 A1* | 5/2018 | Kollin | G02B 27/0103 |
| 2019/0339447 A1* | 11/2019 | Shipton | G02B 27/4272 |
| 2019/0339448 A1* | 11/2019 | Shipton | G02B 6/122 |
| 2019/0339449 A1* | 11/2019 | Shipton | G02B 6/122 |
| 2019/0339515 A1* | 11/2019 | Thakur | G02B 27/283 |

* cited by examiner

*Primary Examiner* — Andrew Jordan
(74) *Attorney, Agent, or Firm* — Michael A. Davis, Jr.; Charles A. Brill; Frank D. Cimino

(57) ABSTRACT

The pupil formed by an optical apparatus is expanded by use of a beam splitter to replicate the pupil and a waveguide to further replicate the replicated pupil. An optional rotator element can rotate a portion of the light split by the beam splitter to provide consistent polarization of light in the optical apparatus. In some embodiments, the beam splitter replication expands the pupil in one direction, while the waveguide replication expands the pupil in a second direction.

20 Claims, 7 Drawing Sheets

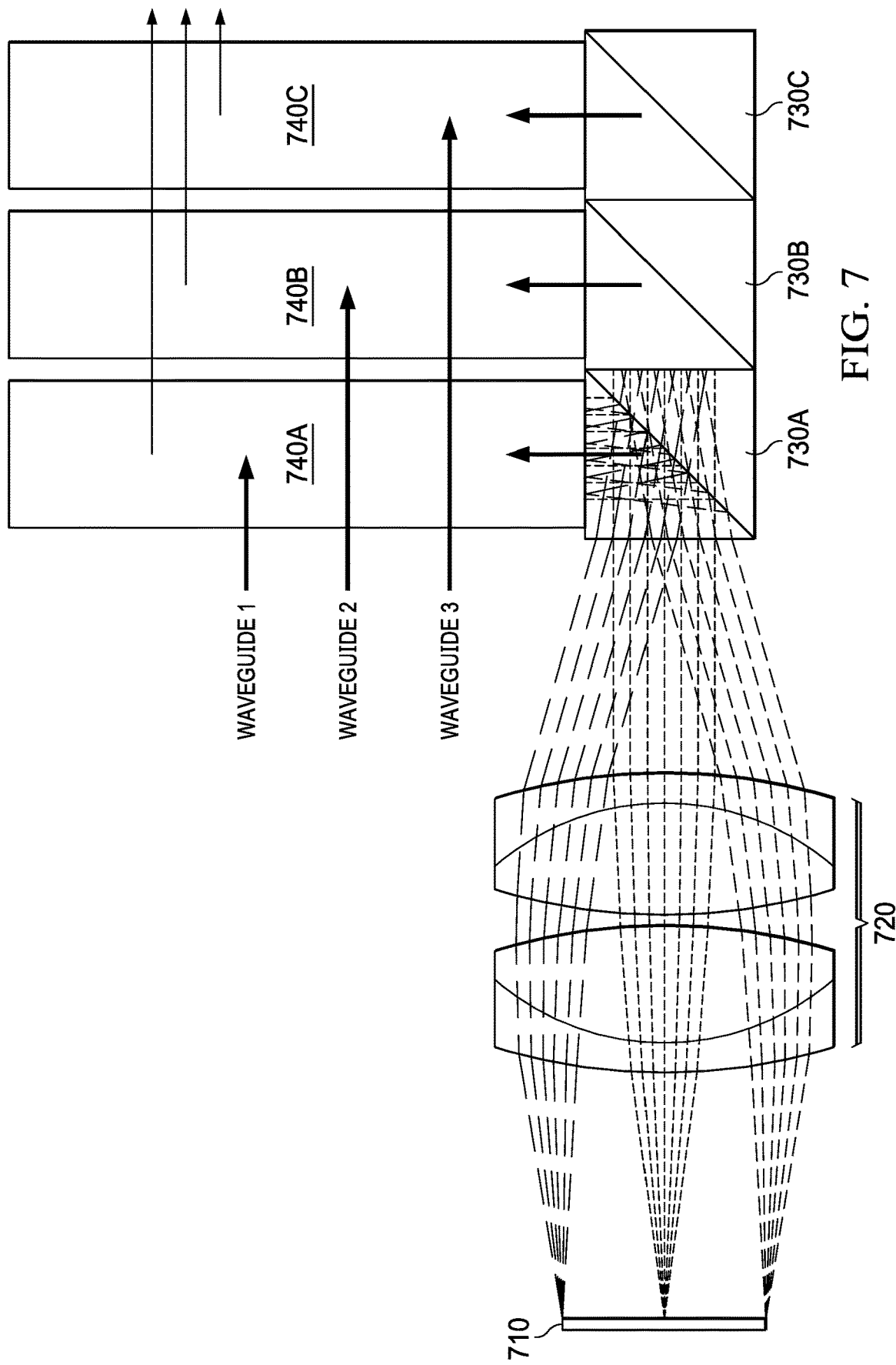

EXPANDING A PUPIL USING REPLICATION VIA BEAM SPLITTER FEEDING A WAVEGUIDE

CROSS REFERENCE TO RELATED APPLICATIONS

This application claims the benefit of U.S. Provisional Application No. 62/666,476, entitled "Methods to Expand Pupil Using Replication," filed May 3, 2018, and U.S. Provisional Application No. 62/786,881, entitled "Expanding a Pupil Using Replication," filed Dec. 31, 2018, which are incorporated by reference in their entirety for all purposes.

TECHNICAL FIELD

The present disclosure relates to the field of optics, and in particular to techniques for expanding a pupil using replication.

BACKGROUND ART

As near-eye displays, such as virtual reality goggles, and heads-up displays become more prevalent, optical issues such as the pupil size of the optical apparatus (sometimes referred to as the exit pupil size) have become more important. In such applications, a bigger pupil size is preferred, however, a trade-off exists between field of view (FOV), pupil size, the f-number of the optics, and a display panel size that is to be seen through the optics of the system. For a given display panel size and f-number, the FOV decreases as pupil size increases. In near-eye displays in particular, the size, weight, and cost of the display panel size mean that smaller display panels are more desirable, which tends to mean that the pupil size is also smaller.

Optical systems used to create an image suitable for viewing with the eye are designed to create a virtual image. This virtual image can only be seen in its entirety when the observer's eye pupil is inside a viewing area known as the exit pupil of this optical system. It is more comfortable and ergonomic for the viewer of the virtual image if this exit pupil is large compared to the eye's pupil since small motions of the head or eye do not affect the users view of the virtual image. A large eyebox is normally difficult to create, as it requires lenses and mirrors that are larger than desired especially for wearable near eye displays. The development of waveguide pupil expanders has offered a potential solution to this problem by allowing for the optical system exit pupil to start small at the input to the waveguide and then expand becoming large at a designated exit area.

An exit pupil of the optical system designed to create a virtual image is placed at the entrance to a waveguide specifically designed as a pupil expander. The waveguide pupil expander works by coupling in this pupil light with a diffraction grating which changes the input light ray angles so that they remain trapped inside and travel along the waveguide by the phenomena of total internal reflection. When the light reaches the exit port area of the waveguide a second diffraction grating slowly releases the trapped rays allowing them to escape the over a larger area. The difference between the input area where the original optical system pupil was coupled into the waveguide and the expanded pupil over the area where the light was allowed to leak out of the waveguide is the degree of pupil expansion. In any method of pupil expansion, the angle of the light rays must be preserved from the input to the output as any ray angle deviations will lead to image artifacts such as distortions or even multiple ghost images if the ray angles flip direction.

Waveguides can be designed to expand the pupils in one or two dimensions depending on the design of the diffraction gratings and internal structure. However, pupil expansion by allowing light to leak out of the exit port of the pupil expander waveguide creates several image artifacts which are undesirable. As the light rays are slowly diffracted out the energy in those rays slowly decreases. This leads to a brightness decrease in the virtual image brightness depending on the position of the eye in the expanded pupil. Another problem which is related to this is the shifting in color of a white image due to different amounts of blue, red and green light diffracted out of the waveguide at different rates. These are just a few of the artifacts possible but all are related and get more severe as the pupil is expanded to a greater extent.

SUMMARY

In one aspect, a pupil expansion apparatus comprises a first beam splitter, configured to receive light from an optic and to replicate a pupil formed by the optic; and a first waveguide, coupled to the beam first splitter, configured to receive light from the first beam splitter and further expand the pupil of the optic.

In a second aspect, an optical apparatus comprises an optical projection system having a pupil; a first beam splitter, coupled to the optical projection system and configured to replicate the pupil; and a first waveguide, coupled to the first beam splitter and configured to replicate the replicated pupil.

In a third aspect, a method of expanding a pupil of an optical apparatus comprises splitting light projected by the optical apparatus using a first beam splitter, replicating the pupil of the optical apparatus in a first direction of a two-dimensional coordinate system; and replicating the pupil of the optical apparatus in a second direction of the two-dimensional coordinate system by a first waveguide optically coupled to the first beam splitter.

BRIEF DESCRIPTION OF DRAWINGS

FIG. 7 is a block diagram of a pupil expansion apparatus that employs beam splitters and three waveguides, according to one embodiment.

DETAILED DESCRIPTION

Figure 1:
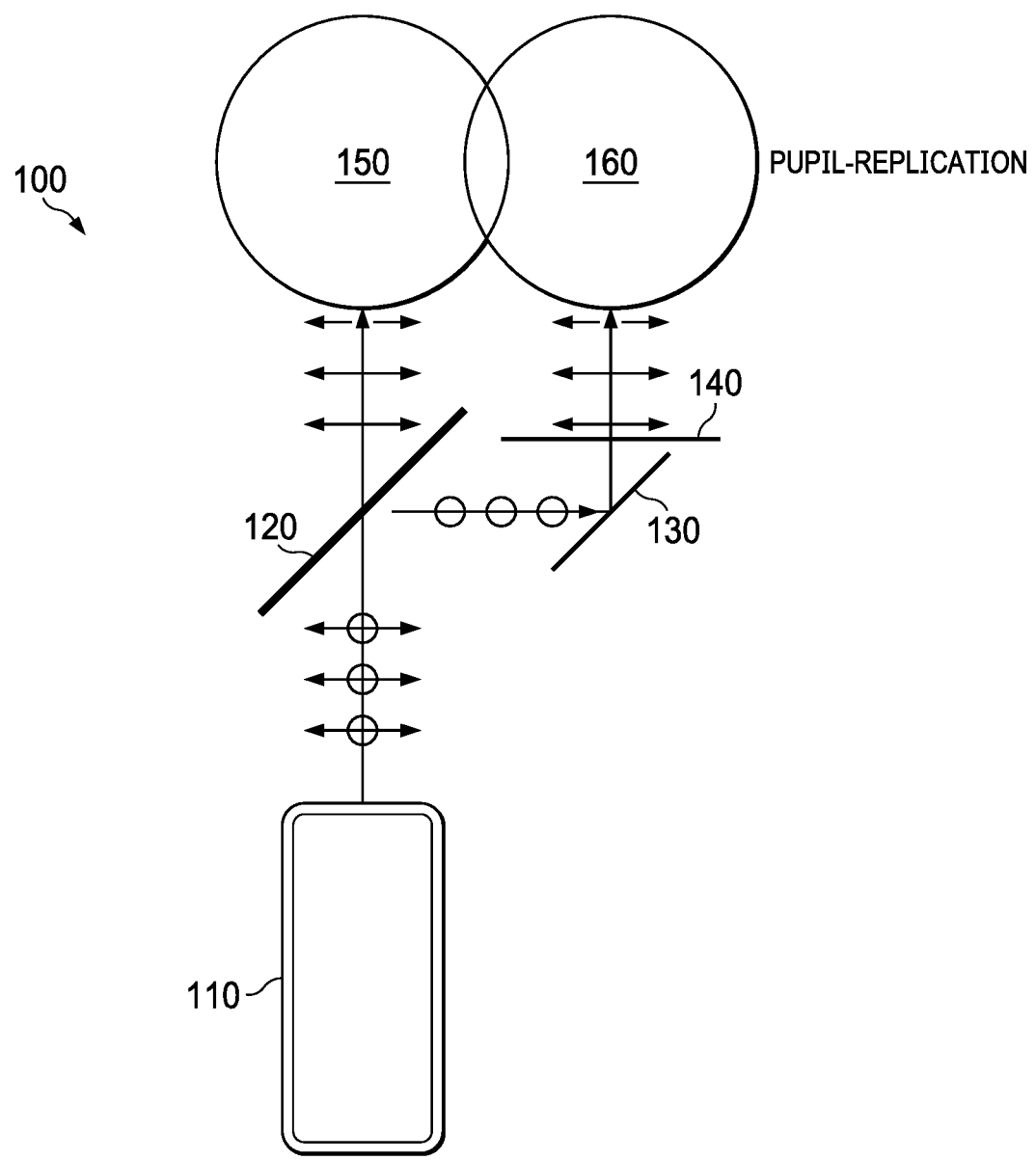
FIG. 1 is a block diagram illustrating a pupil expansion apparatus for use with a projection system having pupil forming optics, according to one embodiment.

In the following description, for purposes of explanation, numerous specific details are set forth in order to provide a thorough understanding of the disclosed embodiments. It will be apparent, however, to one skilled in the art that the embodiments may be practiced without these specific details. In other instances, structure and devices are shown in block diagram form in order to avoid obscuring the described examples. References to numbers without subscripts are understood to reference all instances of subscripts corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one."

The term "or" means any of the alternatives and any combination of the alternatives, including all of the alternatives, unless the alternatives are explicitly indicated as mutually exclusive.

The phrase "at least one of" when combined with a list of items, means a single item from the list or any combination of items in the list. The phrase does not require all of the listed items unless explicitly so defined.

In this description, the term "couple" or "couples" means either an indirect or direct connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

In this description, the term "pupil" means the virtual image of an aperture associated with mirrors, prisms, lenses, and their combinations. The virtual image of the physical aperture as seen through the front of the lens system is known as the entrance pupil. The corresponding image of the aperture as seen through the back of the lens system is known as the exit pupil. When expansion of the pupil is described below, the description is about the expansion of the exit pupil. Expansion of the exit pupil is performed by replication of the entrance pupil, so that a single light ray received into the entrance pupil is split into a plurality of parallel light rays distributed along the direction of expansion of the exit pupil.

In this description, the term "waveguide" means a structure that guides optical waves with minimal loss of energy. Optical waveguides are typically dielectric waveguides, in which a dielectric material with high permittivity is surrounded by a material with lower permittivity. The optical waveguide guides optical waves by total internal reflection. Other types of waveguides may be used, however. Waveguides may expand the exit pupil in either one or two dimensions, depending on the waveguide structure.

In this description the term "optic" or "optics" means the lens or other optical components in an optical apparatus, and the term "optical" means utilizing the properties of light.

As the amount of pupil expansion by a waveguide increases, the waveguide's efficiency and uniformity decrease. Over distance with many waveguides, the overall brightness and uniformity of the virtual image may decrease. Thus, increasing the pupil size optically prior to pupil expansion by waveguides can improve both uniformity and efficiency of the waveguide system, by allowing the use of shorter or fewer waveguides. In addition, if separate waveguides expand the pupil in opposite directions, then the respective sizes of those waveguides can be reduced by half, with improved uniformity and throughput performance.

In a single waveguide, color efficiency and uniformity can be difficult to achieve. By splitting the pupil into several colors or polarizations, multiple stacked waveguides can be used, allowing each waveguide to be optimized for a specific color band.

Furthermore, the pupil should be expanded in both two-dimensional coordinate system directions to avoid asymmetric expansion. If a projection system has a waveguide that expands the pupil in only one direction and creates an asymmetric pupil, for example, there are advantages to start with a pupil input to the waveguide that is larger in size in the direction that is not expanded by the waveguide. For these anamorphic pupil input cases, a digital micromirror device (DMD) such as a DLP® chip from Texas Instruments, Inc., can have very small pixels that use faster optics (such as f1.0 in the Y direction along the tilt axis) to create a larger pupil in the Y direction, but in the X direction, such designs are constrained to f2.4 because of tilt angle. (DLP is a registered trademark of Texas Instruments, Incorporated.). Accordingly, a technique that allows optical expansion of the pupil in one of the two dimensions of a two-dimensional coordinate system can work well in combination with DLP projectors that expand the pupil asymmetrically in the other dimension, providing a more symmetric two-dimensional pupil expansion. The apparatus and techniques described below can solve these problems by expanding the pupil in either the X or Y direction by pupil replication, overcoming the limitations described above. As described below, the angular content of the light beam forming the pupil is preserved. For example, a light ray at +10 degrees remains at +10 degrees to within a very small angle after pupil replication and does not change angle or flip direction to −10 degrees during the replication procedure to prevent virtual image artifacts such as blurring, double images, and image reversal.

Turning now to FIG. 1, a block diagram illustrates a pupil expansion apparatus 100 for use with a projection system 110 having pupil optics, according to one embodiment. In this example, which omits the waveguide portion of the apparatus, light flux from the projection system 110 passes through beam splitter 120. As illustrated, half of the light goes through the beam splitter 120, producing pupil 150, which the other half of the light is reflected by the beam splitter 120, producing replicated pupil 160. In this example, a fold mirror 130 is used to position the pupil as desired.

The beam splitter 120 can also be a polarized beam splitter. Because if the light from the projection system 110 is randomly polarized, half of the light is polarized in a first direction and half is polarized in a direction orthogonal to the first direction. A polarizing beam splitter lets light polarized in one direction pass through, while reflecting light polarized in the other direction. In such an embodiment, an optional optical polarization rotator 140 can be used to change the polarity of light reflected by the beam splitter 120, so that the pupil 160 produces a virtual image of the same polarity as pupil 150, for uniformity.

Other types of beam splitting can be used. For example, the beam splitter 120 may be a dichroic beam splitter, so that the beam splitter 120 splits the light from the projection system 110 based on the wavelengths of the light, allowing a chosen color to pass through, while reflecting other colors. Alternately, the beam splitter 120 may be configured to allow less than half of the light to pass through while reflecting more than half. In such a configuration, multiple beam splitters could be used to replicate the pupil 150 more than once. For example, a ⅓-⅔ beam splitter could be paired with a ½-½ beam splitter to replicate the pupil twice, each pupil having ⅓ of the light.

Figure 2:
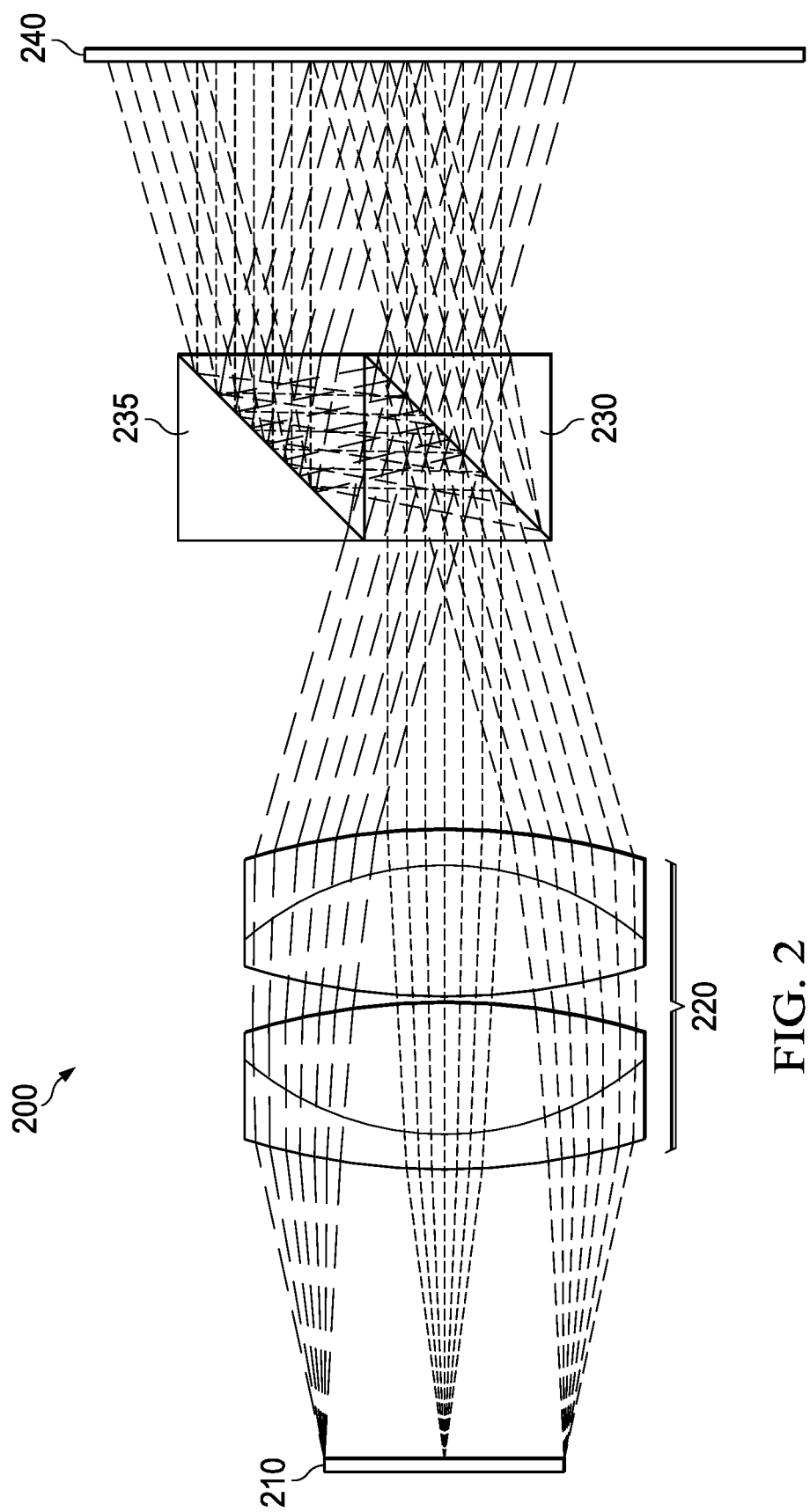
FIG. 2 is a block diagram illustrating a system that uses glass or plastic prisms to perform the beam splitting according to one embodiment

FIG. 2 is a block diagram illustrating a system 200 that uses glass or plastic prisms to perform the beam splitting according to one embodiment. In this example, a display panel 210, such as a DMD, emits light which is focused by optical lens 220 having a pupil. Prismatic beam splitter 230 then is used as a pupil expander and replicates the pupil once, in this case using a prismatic folding mirror 235 to fold the light split from the beam splitter 230, projecting the virtual image from both the beam splitter 230 and prismatic folding mirror 235 on to a surface 240, expanding the pupil in one dimension of a two-dimensional coordinate system. If that surface 240 is an apparatus such as waveguide pupil expander that can expand the pupil in the other dimension, symmetrical pupil expansion can thus be achieved. Instead of a prismatic folding mirror 235 as illustrated in FIG. 2, a plate mirror can be used for the same function.

As can be seen in FIG. 2, the beam splitter 230 maintains ray angles relative to each other to avoid the image artifacts described previously.

Figure 3:
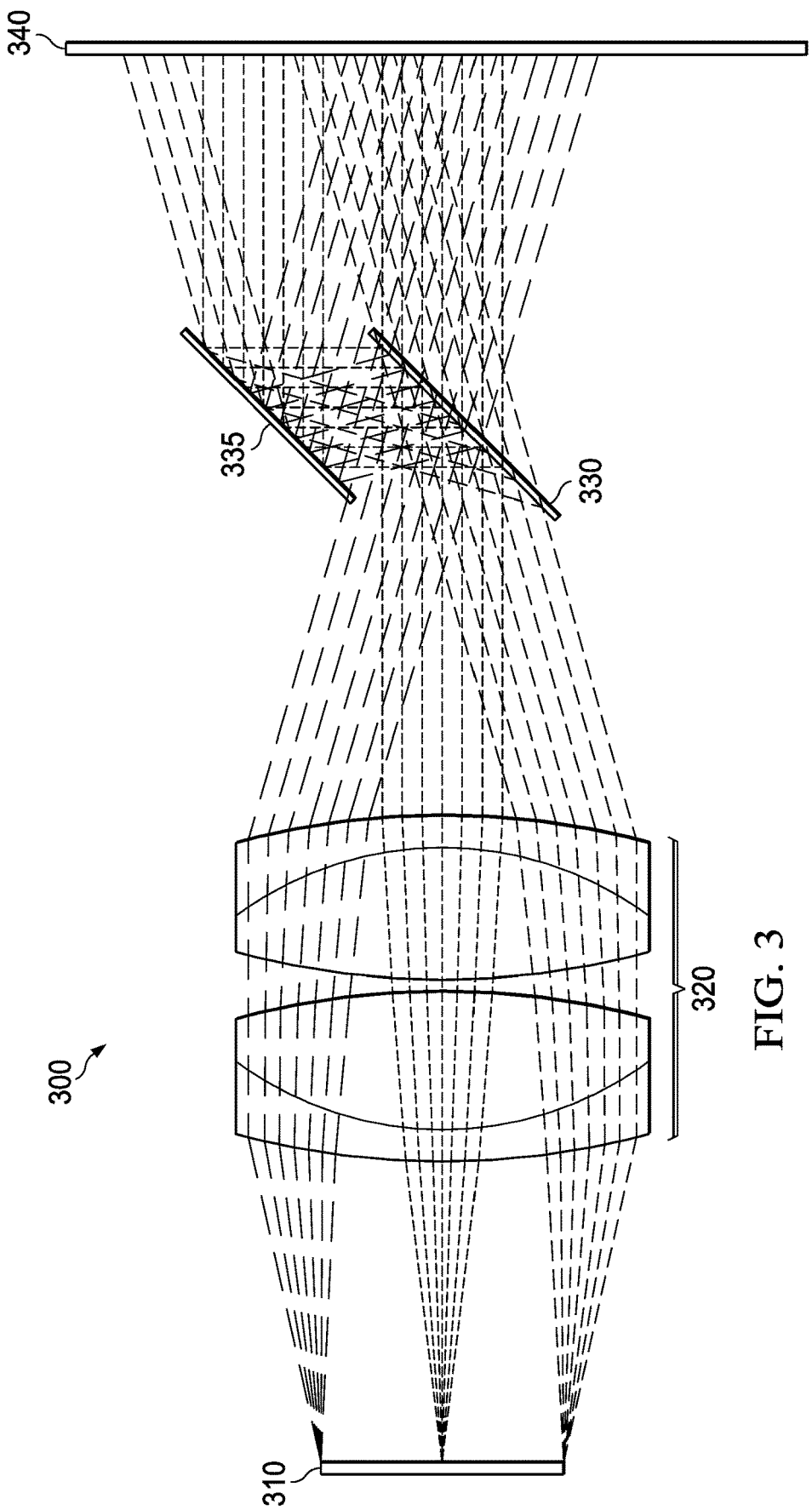
FIG. 3 is a block diagram of a pupil expansion apparatus that employs a plate beam splitter, comprising air spaced partial mirrors according to one embodiment.

FIG. 3 is a block diagram of a similar embodiment 300 that employs a plate beam splitter, comprising air spaced partial mirrors 330 and 335 to expand the pupil formed by lenses 320 for projecting light from display panel 310 onto surface 340. In this embodiment, one mirror performs the beam splitting, and the other mirror serves as a fold mirror for the light, so that the replicated pupil is replicated in one dimension of the two-dimensional coordinate system. As with the prismatic embodiment of FIG. 2, the pupil expansion maintains ray angles so no image artifacts are created. Mirror 335 folds the light similarly to prism 235 in FIG. 2, and a prismatic mirror 235 may be used instead of mirror 335 if desired.

Figure 4:
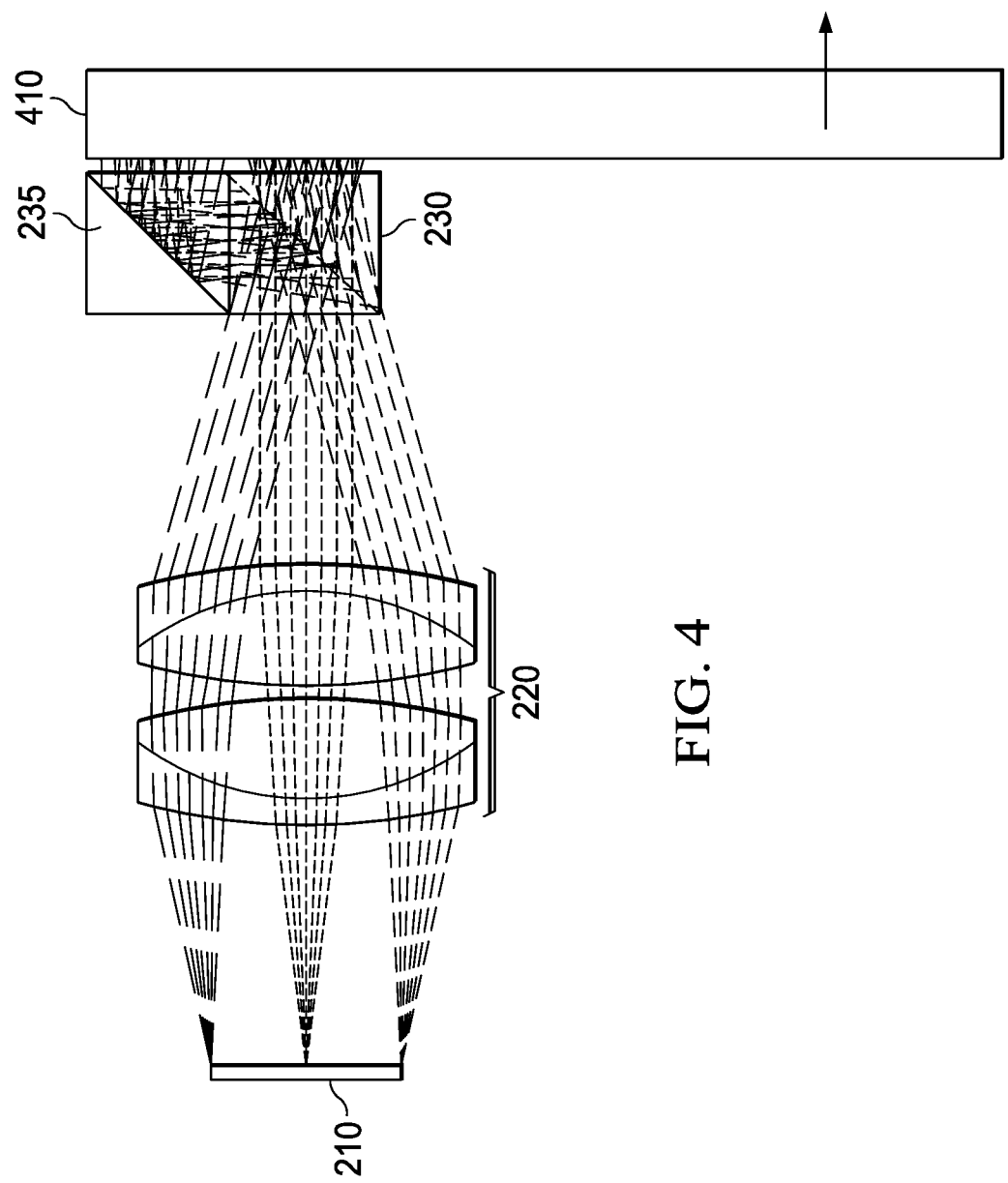
FIG. 4 is a block diagram of a pupil expansion apparatus that employs a waveguide for further pupil expansion, according to one embodiment.

Although not shown in FIG. 2 or 3, as illustrated in FIG. 4 a waveguide 410 can be placed at the output of the beam splitter 230, 330 to further expand the pupil in the same direction as the replication by the beam splitter 230, 330. But because the waveguide starts with an already expanded pupil, a smaller waveguide that reduces the number of pupil replications in the waveguide 410 can be used, resulting in higher efficiency and greater uniformity of the expanded pupil due to less optical loss in the waveguide along the direction of pupil expansion.

Although not illustrated in either FIG. 2 or FIG. 3, polarization beam splitters can be used, along with an optional polarization rotator, similar to the embodiment illustrated in FIG. 1.

Figure 5:
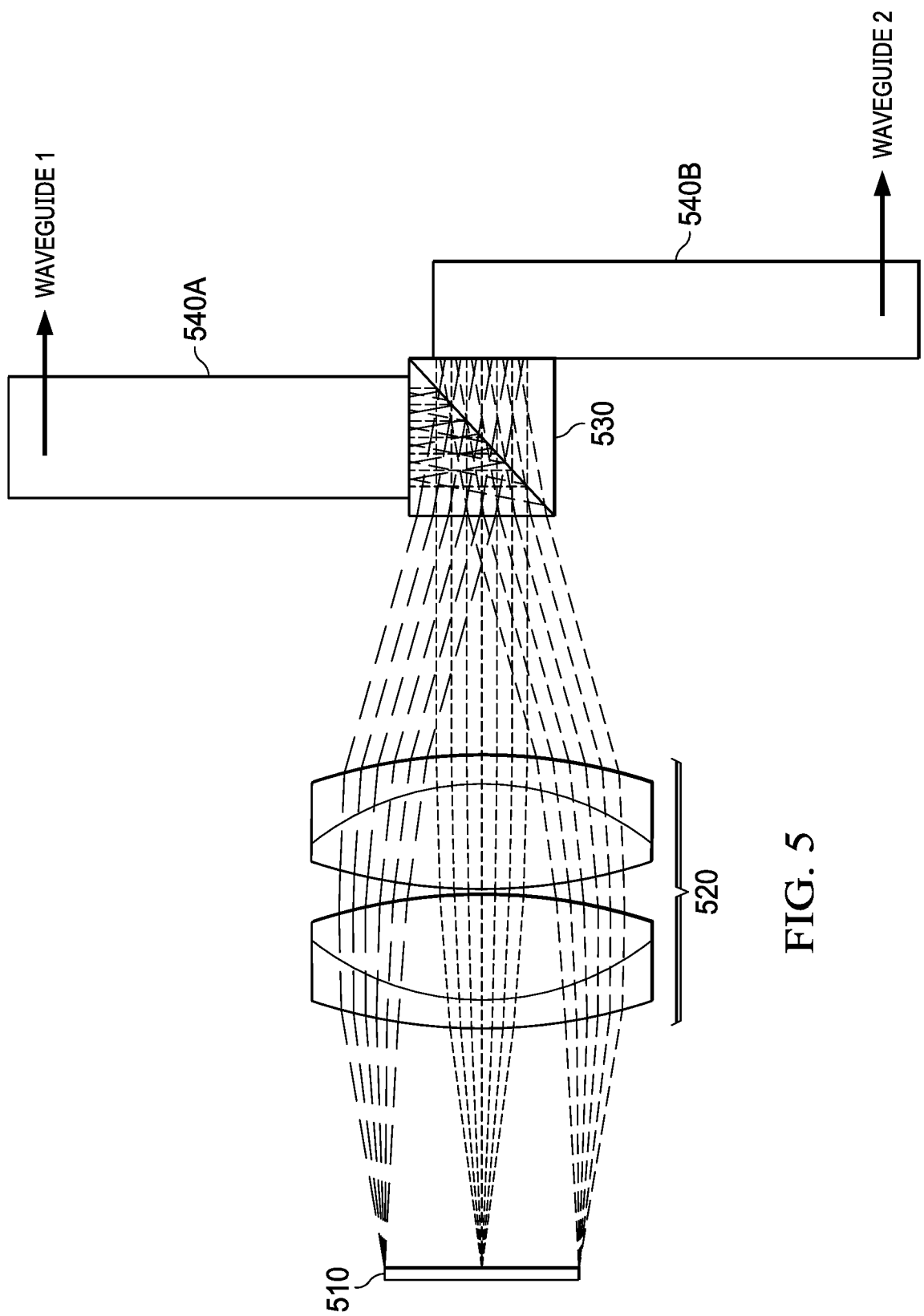
FIG. 5 is a block diagram illustrating performing pupil expansion using two waveguides according to one embodiment.

In FIG. 4, the single waveguide 410 is positioned to receive light from the beam splitter 230 at one end of the waveguide 410. As illustrated in the block diagram of FIG. 5, a single beam splitter, in this case a prismatic beam splitter 530, can split the light from display 510 focused through eyepiece 520, replicating the pupil as described previously. In this embodiment, however, no folding mirror 130 is used, but the beam splitter 530 replicates the pupil into two separate waveguides 540A and 540B. By using two waveguides 540A, 540B, even higher efficiency and greater pupil uniformity may be achieved, because this configuration reduces the amount of pupil expansion achieved by each waveguide 540A, 540B.

Figure 6:
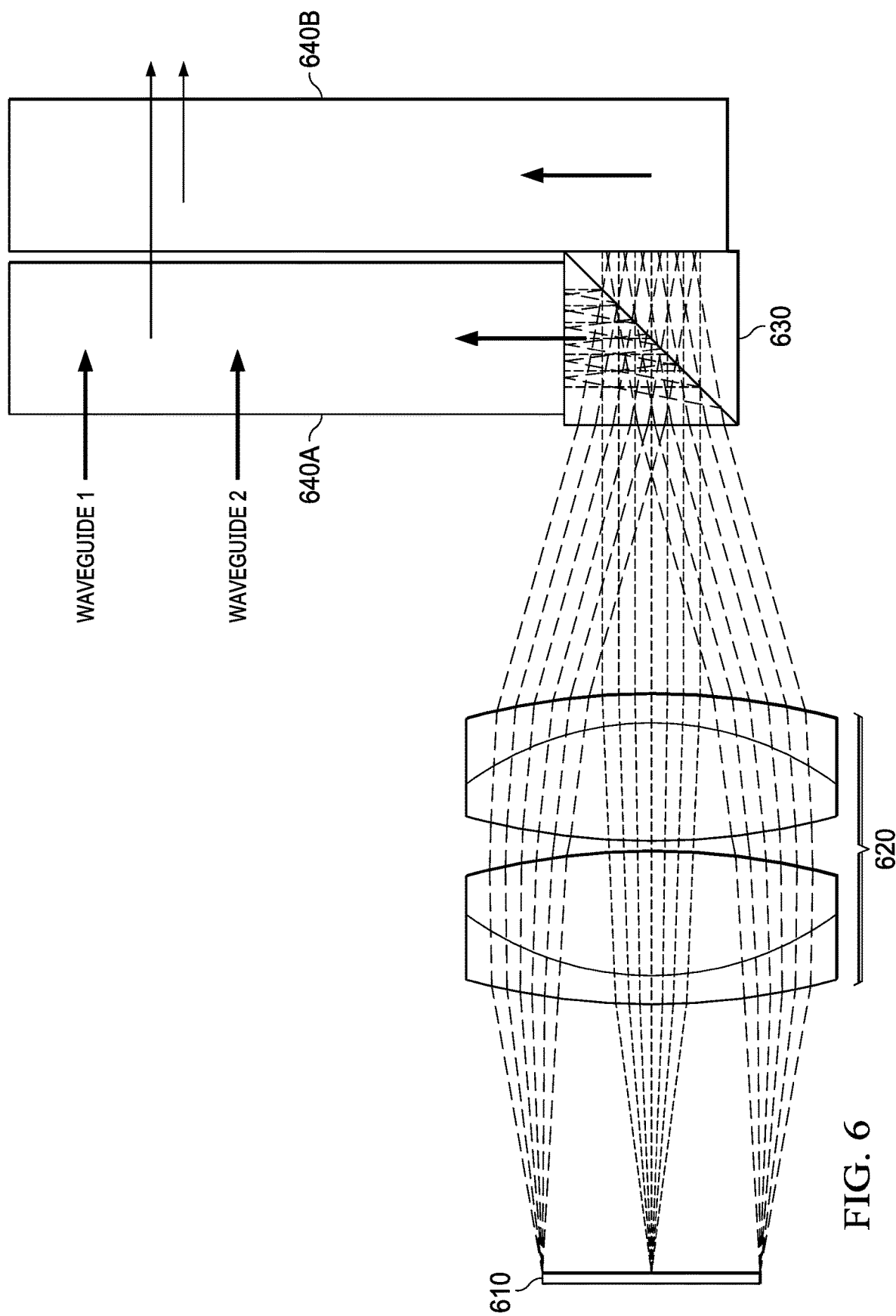
FIG. 6 is a block diagram illustrating performing pupil expansion using two waveguides according to another embodiment.

FIG. 6 is a block diagram illustrating an embodiment of an optical apparatus similar to the ones described above, but in this example the light from display panel 610 passes through eyepiece lens 620 into beam splitter 630 which replicates the pupil into two waveguides 640A and 640B that are positioned adjacent to each other so that light output from waveguide 640A passes through waveguide 640B. In such an embodiment, waveguides 640A and 640B may be switchable waveguides, activating the waveguides 640A and 640B in alternate time periods. In a switchable waveguide, when the waveguide is switched on, pupil expansion will occur in the waveguide, and when the waveguide is switched off, light simply passes through the waveguide. In some embodiments, waveguides may be optimized for colors, such that waveguide 640A may be optimized for red/blue light and waveguide 640B may be optimized for green light. Alternately, beam splitter 630 may be a polarizing beam splitter, and waveguide 640A and 640B may be optimized for different polarizations. This kind of splitting can reduce the demands on the diffractive or holographic surfaces of the waveguide.

FIG. 7 is a block diagram of a similar embodiment in which display panel 710 projects light through lens 720, as before, but in this embodiment, three beam splitters 730A, 730B, and 730C are used with three waveguides 740A, 740B, and 740C. In this embodiment, each beam splitter 730A, 730B, 730C and waveguide 740A, 740B, and 740C may be optimized for red, blue, and green light, further reducing the demands on the diffractive or holographic surfaces of the waveguides 740A, 740B, and 740C.

Although the examples illustrated above inject light into the waveguides at one end of the waveguides, waveguides can be employed that allow injection into the center or other parts of the waveguide.

As described above, by employing beam splitters and waveguides, pupil expansion can be achieved in optical apparatus such as near-eye or heads up displays, using smaller pupils than could be used without pupil expansion and employing replication to expand the pupil optically in one dimension without the degradation or efficiency loss that might be incurred with pupil expansion with just waveguides. This technique can also enable a compact and efficient holographic (light field or multi-focal plane based) head-mounted display or heads up display architecture when used with switchable wave guides or along with multiple polarized illumination sources.

While certain embodiments have been described in detail and shown in the accompanying drawings, it is to be understood that such embodiments are merely illustrative of and not devised without departing from the basic scope thereof, which is determined by the claims that follow.

We claim:
1. A pupil expansion apparatus, comprising:
   a first beam splitter, configured to receive light from an optic and to replicate a pupil formed by the optic; and
   a first waveguide, coupled to the beam first splitter, configured to receive light from the first beam splitter and further expand the pupil of the optic.
2. The pupil expansion apparatus of claim 1,
   wherein the first beam splitter is a polarizing beam splitter, further comprising:
an optical polarization rotator, coupled between the first beam splitter and the first waveguide, configured to rotate polarity of the light received from the first beam splitter.

3. The pupil expansion apparatus of claim 1, wherein the first beam splitter is a dichroic beam splitter.

4. The pupil expansion apparatus of claim 1, wherein the first beam splitter is a plate beam splitter.

5. The pupil expansion apparatus of claim 1, wherein the replication of the pupil by the first beam splitter expands the pupil in a first direction of a two-dimensional coordinate system.

6. The pupil expansion apparatus of claim 1, further comprising a second waveguide, coupled to the first beam splitter, configured to receive light from the first beam splitter.

7. The pupil expansion apparatus of claim 1, further comprising a second beam splitter, coupled to the first beam splitter and configured to receive light from the first beam splitter and transmit a first portion of the light to the first waveguide and a second portion of the light to a second waveguide.

8. The pupil expansion apparatus of claim 7, wherein the first beam splitter and the second beam splitter are of different types.

9. An optical apparatus, comprising:
an optical projection system forming a pupil;
a first beam splitter, coupled to the optical projection system and configured to replicate the pupil; and
a first waveguide, coupled to the first beam splitter and configured to replicate the replicated pupil.

10. The optical apparatus of claim 9,
wherein the first beam splitter is a polarizing beam splitter,
further comprising:
an optical polarization rotator, coupled between the first beam splitter and the first waveguide, configured to rotate polarity of light received from the first beam splitter.

11. The optical apparatus of claim 9, wherein the first beam splitter is a dichroic beam splitter.

12. The optical apparatus of claim 9,
wherein the replication of the pupil by the first beam splitter is in a first direction of a two-dimensional coordinate system, and
wherein the replication of the pupil by the first waveguide is in a second direction of the two-dimensional coordinate system.

13. The optical apparatus of claim 9, wherein the first beam splitter is a prism.

14. The optical apparatus of claim 9, further comprising a second waveguide, coupled to the first beam splitter, configured to receive light from the first beam splitter.

15. The optical apparatus of claim 9, further comprising a second beam splitter, coupled to the first beam splitter and configured to receive light from the first beam splitter and transmit a first portion of the light to the first waveguide and a second portion of the light to a second waveguide.

16. The optical apparatus of claim 15, wherein the first beam splitter and the second beam splitter are of different types.

17. A method of expanding a pupil of an optical apparatus, comprising:
splitting light projected by the optical apparatus using a first beam splitter, replicating the pupil formed by the optical apparatus in a first direction of a two-dimensional coordinate system; and
replicating the pupil of the optical apparatus in a second direction of the two-dimensional coordinate system by a first waveguide optically coupled to the first beam splitter.

18. The method of claim 17, further comprising:
Splitting, by a second beam splitter, light output by the first beam splitter, further replicating the pupil of the optical apparatus; and
replicating the pupil of the optical apparatus further by a second waveguide optically coupled to the second beam splitter.

19. The method of claim 18, activating the first waveguide and the second waveguide at alternate time periods.

20. The method of claim 17, wherein splitting light projected by the optical apparatus comprises splitting light based on wavelengths of the light.

* * * * *